US011415755B2

(12) United States Patent
Yang

(10) Patent No.: US 11,415,755 B2
(45) Date of Patent: Aug. 16, 2022

(54) PARALLEL OPTICAL FIBER ANGLED COUPLING COMPONENT

(71) Applicant: SENKO ADVANCED COMPONENTS, INC., Marlborough, MA (US)

(72) Inventor: Kaifa Yang, Shanghai (CN)

(73) Assignee: Senko Advanced Components, Inc., Hudon, MA (US)

(*) Notice: Subject to any disclaimer, the term of this patent is extended or adjusted under 35 U.S.C. 154(b) by 207 days.

(21) Appl. No.: 16/310,826

(22) PCT Filed: Jun. 22, 2017

(86) PCT No.: PCT/CN2017/089552
§ 371 (c)(1),
(2) Date: Dec. 18, 2018

(87) PCT Pub. No.: WO2017/220002
PCT Pub. Date: Dec. 28, 2017

(65) Prior Publication Data
US 2019/0196114 A1 Jun. 27, 2019

(30) Foreign Application Priority Data
Jun. 24, 2016 (CN) .................. 201620634614.X

(51) Int. Cl.
G02B 6/38 (2006.01)
G02B 6/42 (2006.01)
G02B 6/43 (2006.01)

(52) U.S. Cl.
CPC ......... *G02B 6/3822* (2013.01); *G02B 6/3829* (2013.01); *G02B 6/42* (2013.01); *G02B 6/425* (2013.01); *G02B 6/43* (2013.01)

(58) Field of Classification Search
CPC .... G02B 6/3822; G02B 6/3829; G02B 6/425; G02B 6/43
See application file for complete search history.

(56) References Cited

U.S. PATENT DOCUMENTS 4,225,213 A 9/1980 McBride, Jr. et al.
5,901,262 A 5/1999 Kobayashi et al.
(Continued)

FOREIGN PATENT DOCUMENTS

CN 101587205 A 11/2009
CN 103383482 A 11/2013
(Continued)

OTHER PUBLICATIONS

International Preliminary Report on Patentability for PCT/CN2017/089551, dated Jan. 3, 2019, 13 Pages.
(Continued)

*Primary Examiner* — Andrew Jordan

(57) ABSTRACT

A parallel optical fiber angled coupling component, which is used for parallel coupling of optical signal between the optical fiber array and the laser array, comprises an optical fiber positioning substrate, a cover plate and a plurality of optical fibers. The end face of the optical fiber is polished into a bevel with an inclination of 42.5° or 47.5°, and the bevel of the optical fiber is coated with a metal reflective film. This invention has the following beneficial effects: The end face of the optical fiber is polished into a bevel with an inclination of 42.5° or 47.5° to reduce inter-modal dispersion and increase the transmission distance of the optical signal in the subsequent optical fiber; the bevel of the optical fiber is coated with a metal reflective film, so as to ensure high reflectivity even if the bevel of the optical fiber is covered with glue.

10 Claims, 2 Drawing Sheets

(56) References Cited

U.S. PATENT DOCUMENTS

| | | | |
|---|---|---|---|
| 7,162,124 B1* | 1/2007 | Gunn, III | G02B 6/30 385/27 |
| 7,174,062 B2* | 2/2007 | Fukuyama | G02B 6/3636 385/14 |
| 7,366,380 B1* | 4/2008 | Peterson | G02B 6/4214 385/47 |
| 7,792,401 B2* | 9/2010 | Kang | G02B 6/29317 385/31 |
| 8,064,745 B2* | 11/2011 | Fortusini | G02B 6/34 385/129 |
| 8,639,073 B2* | 1/2014 | Pelletier | G02B 6/30 385/37 |
| 9,341,786 B1 | 5/2016 | Gamache | G02B 6/30 |
| 9,395,502 B2* | 7/2016 | Hung | G02B 6/42 |
| 10,025,033 B2* | 7/2018 | Wang | G02B 6/262 |
| 10,094,989 B2* | 10/2018 | Murakami | G02B 6/4214 |
| 2002/0081078 A1 | 6/2002 | Melchior et al. | |
| 2002/0131727 A1* | 9/2002 | Reedy | G02B 6/4214 385/88 |
| 2004/0057647 A1* | 3/2004 | Lyons | G01F 1/661 385/12 |
| 2005/0141823 A1 | 6/2005 | Han et al. | |
| 2006/0147158 A1* | 7/2006 | Sato | G02B 6/4204 385/78 |
| 2011/0064358 A1 | 3/2011 | Nishimura | |
| 2011/0142395 A1* | 6/2011 | Fortusini | G02B 6/34 385/37 |
| 2012/0263415 A1* | 10/2012 | Tan | G02B 6/43 385/33 |
| 2014/0107630 A1* | 4/2014 | Yeik | A61F 9/008 606/5 |
| 2017/0227723 A1* | 8/2017 | Murakami | G02B 6/4214 |
| 2018/0372966 A1* | 12/2018 | Murakami | G02B 6/4214 |
| 2019/0196114 A1* | 6/2019 | Yang | G02B 6/42 |

FOREIGN PATENT DOCUMENTS

| | | |
|---|---|---|
| CN | 103809250 A | 5/2014 |
| CN | 105372770 A | 3/2016 |
| CN | 205404901 U | 7/2016 |

OTHER PUBLICATIONS

International Preliminary Report on Patentability for PCT/CN2017/089552, dated Jan. 3, 2019, 17 Pages.

Extended European Search Report; Application No. 17814739.3, dated Dec. 17, 2019, pp. 44.

* cited by examiner

PARALLEL OPTICAL FIBER ANGLED COUPLING COMPONENT

CROSS-REFERENCE TO RELATED APPLICATIONS

The present application is a national phase application of PCT/CN2017/089552 which claims priority to Chinese Patent Application No. 201620634614.X filed Jun. 24, 2016, the disclosure of which is incorporated by reference herein.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to an optical element used in the field of optical fiber technology, particularly to an optical fiber angled coupling component used in a parallel optical fiber transmission module.

BACKGROUND

With the advent of the big data era, large data centers have seen rapid growth. Data centers are composed of a large number of servers. Large amounts of data exchange are required between servers. The data interconnection technology is crucial to the efficient operation of large data centers. The traditional electronic interconnection technology can not satisfy the transmission bandwidth and distance requirements, so parallel optical fiber interconnection technology is widely used in the data center. Supercomputer system is composed of a large number of parallel computing modules, a large amount of data exchange is required between the cabinets in which the computing modules are placed, and a parallel optical fiber transmission module becomes the preferred interconnection technology for the supercomputer system.

The emission end of the parallel optical fiber transmission module is generally composed of a laser array and a parallel optical fiber coupling component. The laser array is usually mounted on a circuit board. The light emitting direction of the laser is perpendicular to the circuit board. If a conventional optical fiber array is used for optical signal coupling output, the optical fiber is perpendicular to the circuit board to constitute a T-shaped structure, which is not conducive to the flat design of the module, and cannot meet the high-density interconnection requirement. In order to realize the flat structure design of the parallel optical fiber transmission module, the end face of the optical fiber is usually polished into a bevel with an inclination of 45°. The laser beam is reflected by the bevel and then turned 90° to couple into the optical fiber. In this module structure, the optical fiber is parallel to the circuit board, so as to realize the flat design of the module for high-density optical fiber interconnection.

A large number of guided modes can be transmitted in the optical fiber. The light wave of each guided mode has a different transmission speed in the optical fiber, resulting in inter-modal dispersion. The optical pulses carrying data information are broadened due to the dispersion, resulting in a communication error code. The degree of broadening of the optical pulses increases with the length of the transmission optical fiber, and the error rate deteriorates accordingly. Therefore, the inter-modal dispersion limits the transmission distance of the optical signal in the optical fiber. There are a large number of guided modes in the optical fiber, and the guided modes that can be excited and the optical power proportion of each excited guided mode depend on the excitation condition, that is, the distribution of the incident light field. For example, in the following three cases (normal incidence of the light field from the center of the optical fiber, slightly oblique incidence from the center of the optical fiber, and slightly eccentric normal incidence), the number of excited guided modes and the power proportion of each guided mode will be different, resulting in different inter-modal dispersion values, and there will be differences in the extent of optical pulse broadening. In optical fiber applications, there is a restricted mode launch method, that is, the laser beam is normally incident upon the end face of the optical fiber at a certain centrifugal distance, and the resulting inter-modal dispersion will be much less than that of normal incidence from the center of the optical fiber, thereby increasing the optical signal transmission distance in the optical fiber. If the light beam is made incident upon the center of the optical fiber at a certain inclination, the same effect can be achieved, that is, reduction in inter-modal dispersion and increase in transmission distance.

In the existing parallel optical fiber angled coupling modules, the end face of the optical fiber is usually polished into a bevel with an inclination of 45°. After being reflected by the bevel, the optical signal emitted by the laser is incident upon the center of the optical fiber along the horizontal direction, exciting multi-mode transmission, but the transmission distance is restricted due to inter-modal dispersion.

In the existing parallel optical fiber angled coupling components, no reflective film is coated on the bevel of the optical fiber. As the incident angle of the light beam on the bevel is greater than the critical angle of total reflection, high reflectivity can be achieved according to the principle of total reflection. However, when the component is used in the parallel optical fiber transmission module, a large amount of adhesive glue is used in the module packaging process to improve the mechanical strength of the optical fiber coupling and packaging structure, so the bevel of the optical fiber may be covered with glue. As the refractive index of the glue is close to that of the optical fiber, the total reflection condition of the bevel of the optical fiber is damaged, and the reflectivity drops sharply.

This invention has the following beneficial effects: The end face of the optical fiber is polished into a bevel with an inclination of 42.5° or 47.5° to reduce inter-modal dispersion and increase the transmission distance of the optical signal in the subsequent optical fiber; the bevel of the optical fiber is coated with a metal reflective film, so as to ensure high reflectivity even if the bevel of the optical fiber is covered with glue.

SUMMARY OF THE INVENTION

The purpose of this invention is to provide a parallel optical fiber angled coupling component, which is used for corner coupling of optical signal between the laser array and the optical fiber, so as to reduce inter-modal dispersion in the optical fiber, increase the transmission distance of the optical signal in the subsequent optical fiber, and it is also applicable to the packaging structure where the bevel of the optical fiber is covered with glue.

The parallel optical fiber angled coupling component comprises a positioning substrate, a cover plate and a plurality of optical fibers. The optical fibers are pressed into the micro-groove array on the substrate by the cover plate and fixed with glue. The optical fibers protrude a certain length out of the substrate and cover plate, and the end face of the optical fiber is polished into a bevel with an inclination of 42.5° or 47.5°.

Furthermore, according to the needs of the application occasions, the bevel of the optical fiber may be coated with a highly reflective metal film.

A large number of guided modes can be transmitted in the optical fiber. The light wave of each guided mode has a different transmission speed in the optical fiber, resulting in inter-modal dispersion. The energy of the optical pulses carrying digital signal is distributed to different guided modes for carrying and transmitting. Due to the influence of inter-modal dispersion, in the same optical pulse, the light energy components carried by different guided modes cannot reach the receiving end at the same time, resulting in time difference. As a result, the optical pulses are broadened and the degree of broadening increases with the transmission distance. Optical fiber communication carries digital information through a series of optical pulse sequences. The higher the communication rate, the smaller the time interval between adjacent optical pulses. When the optical pulses are broadened excessively due to dispersion, adjacent optical pulses will overlap, and the signal receiving end cannot identify them correctly, resulting in a communication coding error code. Therefore, based on the requirement on a certain error rate, inter-modal dispersion restricts the optical signal transmission distance in the optical fiber.

A large number of guided modes can be transmitted in the optical fiber, and the guided modes that can be excited and the optical power proportion of each excited guided mode depend on the distribution of the incident light field. For example, compared with normal incidence from the center of the optical fiber, if the laser beam is normally incident upon the end face of the optical fiber at a certain centrifugal distance, the combination of excited guided modes and the optical power proportion of each guided mode are completely different, resulting in different inter-modal dispersion values. In optical fiber applications, there is a restricted mode launch method, that is, the laser beam is normally incident upon the end face of the optical fiber at a certain centrifugal distance, and the resulting inter-modal dispersion will be much less than that of normal incidence from the center of the optical fiber, thereby increasing the optical signal transmission distance in the optical fiber. If the light beam is made incident upon the center of the optical fiber at a certain inclination, the same effect can be achieved, that is, reduction in inter-modal dispersion and increase in transmission distance.

In the existing parallel optical fiber angled coupling components, the end face of the optical fiber is polished into a bevel with an inclination of 45°, so that the optical signal can achieve 90° angled coupling between the laser array and the optical fiber. After the laser beam is reflected by the 45° bevel, it is incident on the center of the optical fiber along the horizontal direction. Then, a set of guided modes will be excited, but the transmission distance is restricted due to the larger inter-modal dispersion. This invention proposes that the end face of the optical fiber is polished into a bevel with an inclination of 42.5° or 47.5°, so that the laser beam is incident upon the center of the optical fiber at an inclination of 5° after being reflected by the bevel, equivalent to restricted mode launch. The set of guided modes excited in this way has a smaller intermodal dispersion than the set of guided modes excited by normal incidence of laser beam upon the center of the optical fiber, and the transmission distance of the parallel optical fiber transmission module can be increased.

When a parallel optical fiber angled coupling component is used in a parallel optical fiber transmission module, it is coupled and packaged with the laser array. In the existing parallel optical fiber angled coupling modules, no reflective film is coated on the bevel of the optical fiber. As the incident angle of the light beam on the bevel is greater than the critical angle of total reflection, high reflectivity can be achieved according to the principle of total reflection. However, a large amount of adhesive glue is used in the module coupling and packaging process to improve the mechanical strength of the optical fiber coupling and packaging structure, so the bevel of the optical fiber may be covered with glue. As the refractive index of the glue is close to that of the optical fiber, the total reflection condition of the bevel of the optical fiber is damaged, and the reflectivity drops sharply.

Compared with the prior art, this invention has the following beneficial effects: The end face of the optical fiber is polished into a bevel with an inclination of 42.5° or 47.5° to reduce inter-modal dispersion and increase the transmission distance of the optical signal in the subsequent optical fiber; the polished surface is coated with a metal reflective film, so as to ensure high reflectivity even if the polished surface of the optical fiber is covered with glue.

In the figures: 1—positioning substrate, 2—cover plate, 3—optical fiber, 4—metal reflective film.

DETAILED DESCRIPTION

The technical solution of the patent is further described in detail below in combination with the specific embodiments.

Figure 1:
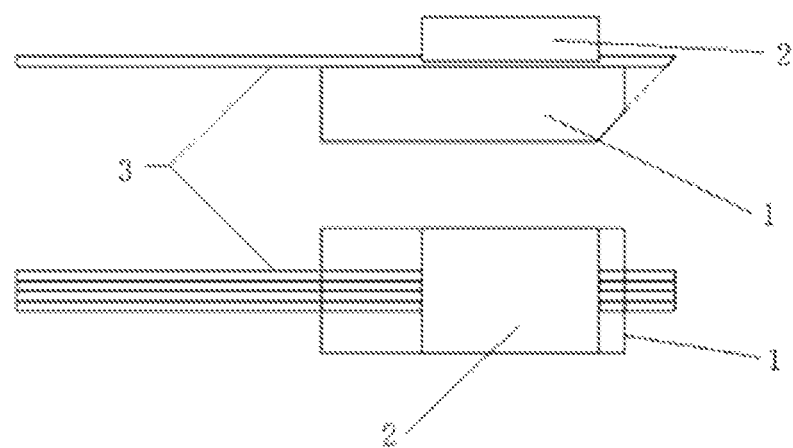
FIG. 1 shows the structure of the parallel optical fiber angled coupling component.
Figure 2:
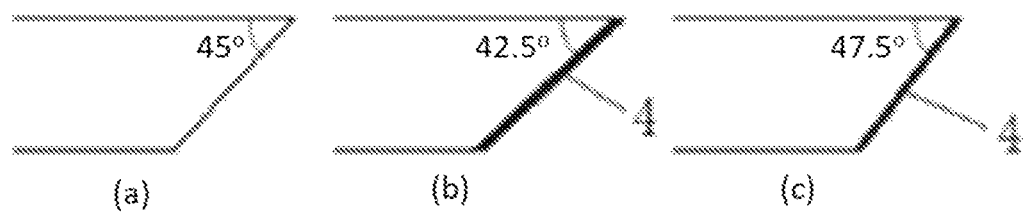
FIG. 2 shows the bevel angle and coating conditions of the optical fiber.

The structure of a parallel optical fiber angled coupling component is shown in FIG. 1, comprising a positioning substrate 1, a cover plate 2 and a plurality of optical fibers 3. The optical fibers 3 are pressed into a plurality of positioning grooves on the positioning substrate 1 by the cover plate 2 and fixed with glue. To realize angled coupling of the optical signal from the laser to the optical fiber, the end surface of the optical fiber 3 is polished into a bevel with a certain inclination, as shown in FIG. 2. The existing technical solution is that the bevel inclination of the optical fiber is 45°, as shown in FIG. 2(*a*); the technical solution proposed by this invention is that the bevel inclination of the optical fiber 3 is 42.5° or 47.5°, as shown in FIGS. 2(*b*) and 2(*c*). In the existing technical solution, no reflective film is coated on the bevel of the optical fiber, and high reflectivity of the light beam is realized according to the principle of total reflection, as shown in FIG. 2(a). In the technical solution proposed by this invention, the bevel of the optical fiber is coated with a metal reflective film 4, as shown in FIGS. 2(b) and 2(c).

Figure 3:
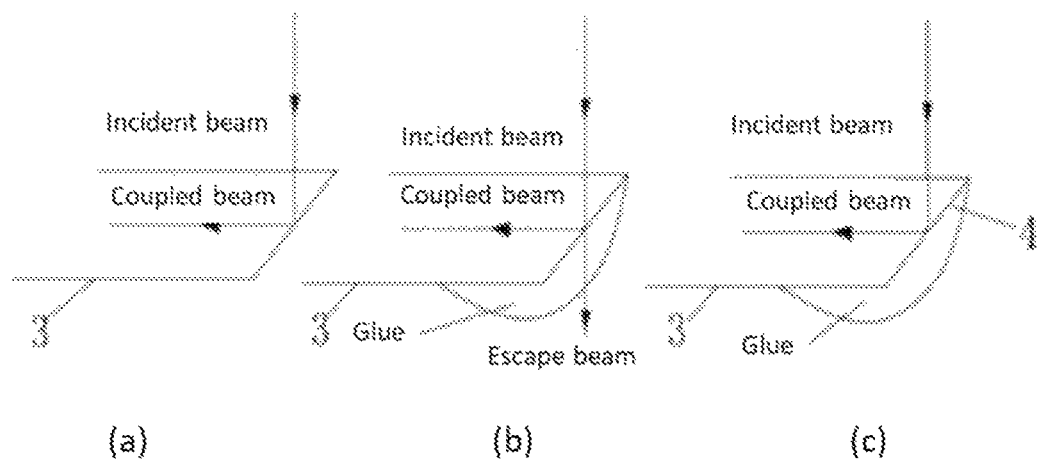
FIG. 3 shows the reflection conditions of the light beam on the bevel of the optical fiber.

The reflection conditions of the light beam on the bevel of the optical fiber are shown in FIG. 3, the incident angle of the light beam on the bevel is greater than the critical angle of total reflection, and high reflectivity can be achieved without a reflective film according to the principle of total reflection, as shown in FIG. 3(a). When the bevel of the optical fiber is covered with glue, as the refractive index of the glue is close to that of the optical fiber, the total reflection condition of the bevel is damaged, the reflectivity drops sharply, and most of the light energy is refracted and escapes as shown in FIG. 3(b); this invention proposes that the bevel of the optical fiber is coated with a metal reflective film 4, so as to ensure high reflectivity even if the bevel of the optical fiber is covered with glue, as shown in FIG. 3(c).

The parallel optical fiber angled coupling component proposed by this invention is used in a parallel optical fiber transmission module, a large amount of adhesive glue is used in the module coupling and packaging process to improve the mechanical strength of the optical fiber coupling and packaging structure, and the bevel of the optical fiber may be covered with glue, so it is necessary to apply a reflective film to ensure high reflectivity of the bevel of the optical fiber. There are mainly two types of optical reflective film, that is, dielectric reflective film and metal reflective film. Dielectric reflective film is a multi-beam interference structure formed by a multi-layer dielectric film. If a multi-layer dielectric reflective film is coated on the bevel of the optical fiber, when the film layer on the bevel is covered with glue, the interference structure of the multi-layer dielectric film will be damaged in essence and the reflectivity will decline. Metal reflective film is a single-layer structure, its reflectivity depends on the inherent properties of the metal, and the reflectivity of the metal film will not be affected even if it is covered with glue.

Figure 4:
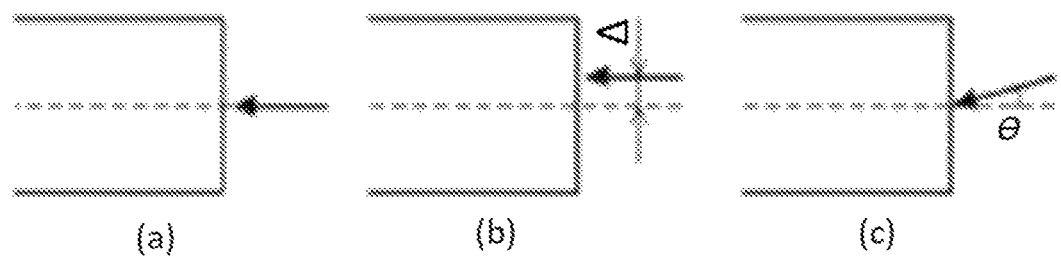
FIG. 4 is the restricted mode launch method of the optical fiber.

A large number of guided modes can be transmitted in the optical fiber, and the guided modes that can be excited and the optical power proportion of each excited guided mode depend on the distribution of the incident light field. When the light beam is normally incident upon the center of the fiber, as shown in FIG. 4(a), a set of guided modes are excited (a set of guided modes include the serial numbers of all the guided modes therein and the power proportion of each guided mode), corresponding to the inter-modal dispersion is D1; when the light beam is normally incident upon the end face of the optical fiber at a certain centrifugal distance Δ, as shown in FIG. 4(b), another set of guided modes are excited, corresponding to the inter-modal dispersion D2. A proper selection of the centrifugal distance Δ can make the inter-modal dispersion D2 less than D1. This method that the position of the incident beam is changed to selectively excite the guided modes in the optical fiber, thereby improving the inter-modal dispersion is called the restricted mode launch method. If the light beam is made incident upon the center of the optical fiber at a certain inclination, as shown in FIG. 4(c), a proper selection of the inclination θ can also produces the restricted mode launch effect, thus reducing the inter-modal dispersion and increasing the optical signal transmission distance.

Figure 5:
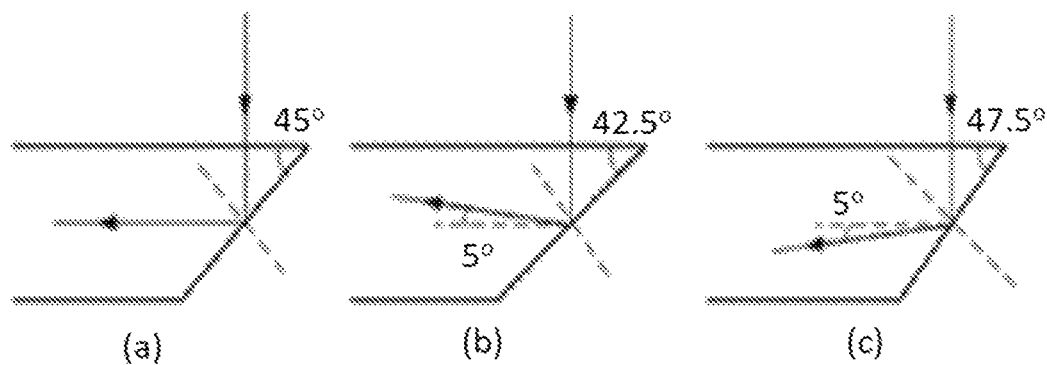
FIG. 5 is a schematic diagram of the restricted mode launch effect resulting from change of the inclination of the bevel of the optical fiber.

In the existing technical solutions of parallel optical fiber angled coupling components, the bevel of the optical fiber has an inclination of 45°, and after being reflected by the bevel, the light beam is incident upon the optical fiber along the horizontal direction, as shown in FIG. 5(a). This invention proposes that the end face of the optical fiber is polished into a bevel with an inclination of 42.5° or 47.5°, as shown in FIGS. 5(b) and 5(c) respectively, and after the light beam is reflected by the bevel, the included angle between the light beam and the optical fiber axis is ±5°, which is equivalent to the oblique incidence in FIG. 4(c) and produces a restricted mode launch effect. Therefore, a set of guided modes that are excited in the optical fiber have an optimized inter-modal dispersion, and the optical signal can travel a longer distance.

The above content is a further detailed description of this invention in combination with the embodiments, and it should not be considered that this invention is limited to the embodiments as described above. For those skilled in the art, some simple deductions or replacements can be made without departing from the concept of this invention, and should all be considered to fall within the scope of protection of this invention.

The invention claimed is:

1. A parallel optical fiber angled coupling component for parallel coupling of optical signal between an optical fiber array and a laser array, comprising an optical fiber positioning substrate, a cover plate and a plurality of optical fibers;
    wherein the optical fibers are pressed into a micro-groove array on the optical fiber positioning substrate with the cover plate and fixed with glue; and
    wherein the optical fibers protrude a certain length out of the optical fiber positioning substrate and cover plate.

2. A parallel optical fiber angled coupling component according to claim 1, wherein an end face of each of the optical fibers is polished into a bevel with an inclination angle of 42.5° approximately.

3. A parallel optical fiber angled coupling component according to claim 1, wherein an end face of each of the optical fibers is polished into a bevel with an inclination angle of 47.5° approximately.

4. A parallel optical fiber angled coupling component according to claim 1, wherein an end face of each of the optical fibers is polished into a bevel and the bevel of each of the optical fibers is coated with a metal reflective film.

5. A method of parallel coupling optical signal between an optical fiber array and a laser array, the method comprising:
    providing an optical fiber positioning substrate, a cover plate and a plurality of optical fibers; and
    pressing the optical fibers into a micro-groove array on the optical fiber positioning substrate with the cover plate and fixed with glue;
    wherein the optical fibers protrude a certain length out of the optical fiber positioning substrate and cover plate.

6. A method of parallel coupling optical signal between an optical fiber array and a laser array according to claim 5, wherein an end face of each of the optical fibers is polished into a bevel with an inclination angle of 42.5° approximately.

7. A method of parallel coupling optical signal between an optical fiber array and a laser array according to claim 5, wherein an end face of each of the optical fibers is polished into a bevel with an inclination angle of 47.5° approximately.

8. A method of parallel coupling optical signal between an optical fiber array and a laser array according to claim 5, wherein an end face of each of the optical fibers is polished into a bevel and the bevel of each of the optical fibers is coated with a metal reflective film.

9. A parallel optical fiber angled coupling component according to claim 1, wherein an end face of each of the optical fibers is polished into a bevel and each bevel is covered in glue.

10. A method of parallel coupling optical signal between an optical fiber array and a laser array according to claim 5, wherein an end face of each of the optical fibers is polished into a bevel and each bevel is covered in glue.

* * * * *